L. J. R. HOLST.
MEANS FOR MECHANICALLY FOCUSING PHOTOGRAPHIC LENSES.
APPLICATION FILED JUNE 1, 1911.

1,029,296.

Patented June 11, 1912.
3 SHEETS—SHEET 3.

FIG. 3.

WITNESSES
Thomas M. Smith
Elisabeth D. Shildrake

INVENTOR
Lodewyk J. R. Holst,
BY J. Walter Douglass
ATTORNEY

UNITED STATES PATENT OFFICE.

LODEWYK J. R. HOLST, OF LANSDOWNE, PENNSYLVANIA, ASSIGNOR TO WILLIAMS, BROWN AND EARLE, INC., OF PHILADELPHIA, PENNSYLVANIA, A CORPORATION OF PENNSYLVANIA.

MEANS FOR MECHANICALLY FOCUSING PHOTOGRAPHIC LENSES.

1,029,296.   Specification of Letters Patent.   Patented June 11, 1912.

Application filed June 1, 1911. Serial No. 630,628.

*To all whom it may concern:*

Be it known that I, LODEWYK J. R. HOLST, a citizen of the United States, residing in Lansdowne, in the county of Delaware and State of Pennsylvania, have invented certain new and useful Improvements in Means for Mechanically Focusing Photographic Lenses, of which the following is a specification.

My present invention in principle is based upon the art of mechanically focusing photographic lenses forming the subject-matter of applications for United States Letters Patent, Serial No. 625,529, filed by me under date of May 6th, 1911 and Serial No. 640,902 filed by me, July 27th 1911, and furthermore embodies modification in mechanism for carrying into effect the aforementioned art, forming the subject-matter of an application for United States Letters Patent, Serial No. 625,872, filed by me, under date of May 8th, 1911.

The mechanism disclosed in my companion application for a United States patent, Serial No. 625,529, filed by me May 6th 1911, is on account of purely mechanical considerations, limited in its adaptability to lenses of comparatively short focal length and is not well suited for use with lenses of 12 inches focal length or more, which are used for photo-mechanical purposes. The focal length of such lenses range practically from 12 to 30 inches. The required displacements of the lens and object-support for given proportions between object and image are directly proportional to the focal length of the lens used, and it is the object of the present invention to provide means, whereby displacements of the magnitude required for lenses of the before mentioned focal length can be derived from a focusing mechanism of small mechanical proportions to insure accurate and satisfactory practical operations.

The nature, scope and characteristic features of my present invention will be more fully understood from the following description taken in connection with the accompanying drawings forming part hereof, in which—

Figure 1:
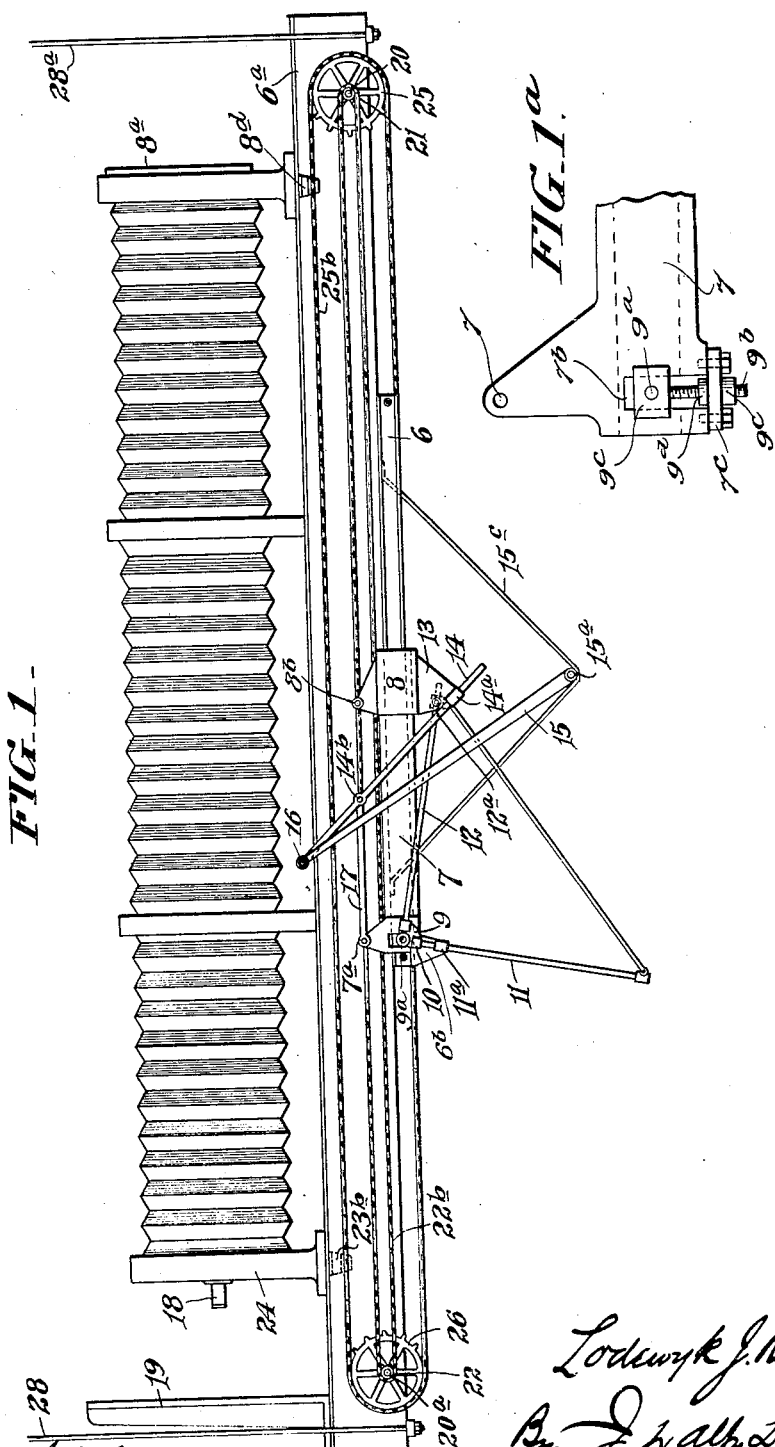
Figure 2:
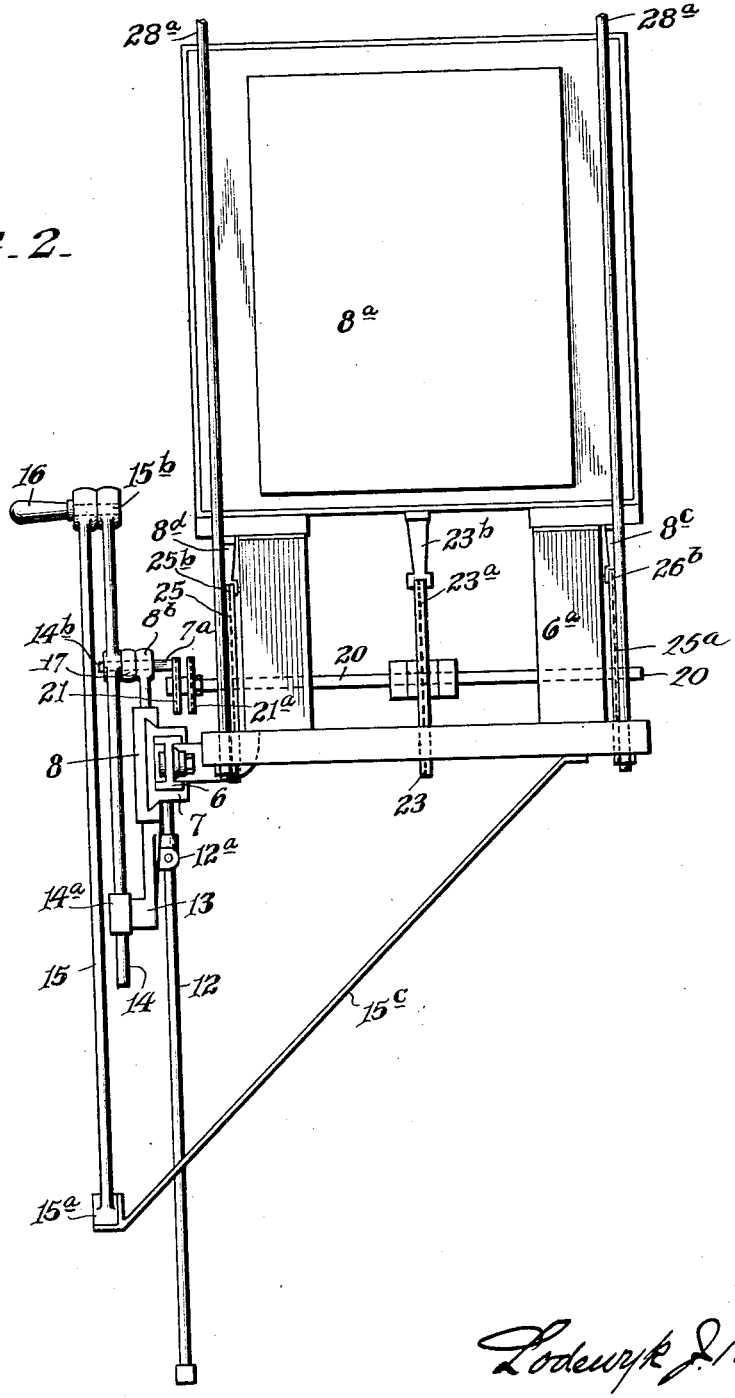

Figure 1, is a longitudinal side elevation of a form of focusing means as applied to cameras used for photo-mechanical purposes, showing the object, the lens support extended, and means for controlling shiftings thereof in respect to the object and image. Fig. 1ª, is a detail view, showing means, to regulate the standard focus, as hereinafter described. Fig. 2, is an enlarged end elevational view of the mechanical elements and plate holding frame of the apparatus of Fig. 1; and Fig. 3, is a plan view of the camera-bed, showing the chain connections between the lens and plate carriers and their respective slides.

Figs. 1, 2 and 3, show an adaptation of my device to a lens of twenty-four inch focus giving adjustments ranging from a magnification of six diameters to a reduction of six diameters. The supporting-bed-plate 6, is attached rigidly to the camera-bed 6ª, and on it are placed the lens-slide 7, and plate-slide 8. The slide 7, carries a transversely projecting pivot pin 9ª, hereinafter referred to as the driving point of the lens-slide 7, on which the center-plate 9, carrying the slide-rods 11 and 12, is journaled. Slide-rod 11 coöperates with the guide-block 11ª, pivoted in an extension 6ᵇ, of the supporting bed-plate 6. The slide-rod 12, coöperates with the guide-block 12ª, pivoted on the downwardly extending portion 13, of the plate-slide 8, which pivot is hereinafter referred to as the plate-slide driving point. In this constructional form the center of the pivot of guide-block 11ª, constitutes the fulcrum and the centers of the pivot 9ª, and the guide-block 12ª, constitute respectively, the driving points of the lens-slide and plate-slide. The support 15ᶜ, attached to the stationary part of the mechanism carries the pivot 15ª, of the operating lever 15, to which at its upper end the double armed lever-rod 14, is pivoted. At 14ᵇ, a connector 17, is pivoted to the rod 14. The other end of the connector 17, is pivoted to an upward extension 7ª, of the lens-slide 7, thereby transmitting the driving power exerted on the handle 16, to the said slide. This mechanism will thus produce conjugate distances between the fulcrum and the driving point on the lens-slide and between the driving points on said slides, corresponding to a focal length equal to the height of the pivot 9ª, above the imaginary line uniting the fulcrum center with the center of the driving point on the plate-slide. Fig. 1ª, shows in detail how the pivot-pin 9ª, is adjustable in the slot 7$^b$, of the lens-slide 7, by means of the block 9$^c$, in which said pin 9$^a$, is securely fastened, and which block is adjustable by means of the screw-stud 9$^b$, and the lock nuts 9$^d$ and 9$^e$, bearing respectively against the upper and lower face of the lens-platen 7$^c$, which is attached to the lens-slide 7. This height is called the standard focus of the apparatus and the conjugate distances before mentioned are called the standard conjugate distances. From the mathematical formula determining the relation between the focus and the conjugate foci, as fully described in my before mentioned application for United States Letters Patent Serial No. 625,529, under date of May 6th, 1911, it is seen that these values are all in direct proportion to each other, that is, that with the increase and decrease of the principal focus both conjugate foci increase and decrease in the same ratio. If thus the actual equivalent focus of the lens used in Fig. 1, is four times larger than the standard focus of the mechanism, the actual conjugate-foci, for given proportions of object and image, will also be four times larger than the standard conjugate foci produced by the focusing mechanism as so far described, and it will be necessary to provide means to magnify the displacement of the lens slide 7, and the plate-slide 8, also in ratio of four to one, in order to drive the lens 18, and the plate-carrier 8$^a$ through the required distances. This is accomplished as follows: At either end of the camera bed 6$^a$, transverse spindles 20 and 20$^a$, Figs. 1 and 3, are suitably supported, and on portions of these spindles projecting outside the camera bed 6$^a$, sprockets 21, 22 and 21$^a$, 22$^a$, are mounted. The sprocket 22 is fast on the spindle 20$^a$, and the sprocket 21$^a$, is fast on the spindle 20, whereas the sprockets 22$^a$ and 21, are freely mounted on their respective spindles. A chain or other suitable flexible band 22$^b$, is fastened to the extension 7$^a$, of the slide 7, and passes around the sprocket 22, thence around the sprocket 21, and is fastened with its other end to the extension 7$^a$, thus forming an endless band, and causing the sprocket 22 and the spindle 20$^a$, to rotate in harmony with the sliding movement of the lens slide 7. Between the two members of the camera bed 6$^a$, a sprocket 23$^c$, is keyed to the shaft 20$^a$, and a similar sprocket 23, is freely mounted on the corresponding point of the shaft 20. An endless chain 23$^a$, is stretched around these sprockets which are four times as large in diameter as the sprockets 22 and 21, so that the chain 23$^a$, will travel four times as far as the chain 22$^b$, and the slide 7, and consequently will produce the required displacements for the lens 18, which by means of the lens support 24, and its downward extension 23$^b$, is attached to the chain 23$^a$. In an entirely similar manner a four fold increased movement of the plate slide 8, is transmitted to the plate support 8$^a$, by means of the small sprocket 21$^a$, keyed to the shaft 20, the loose sprocket 22$^a$, revolving freely on the shaft 20$^a$, and the four large sprockets 25, 25$^a$, 26 and 26$^a$, respectively keyed to the shaft 20, and freely revolving on the shaft 20$^a$, the endless chain 21$^b$, attached to the extension 8$^b$, of the plate slide 8, rotates the sprocket 21$^a$, in harmony with the movements of the saddle 8, which rotation is transmitted by the shaft 20 to the sprockets 25 and 25$^a$, keyed thereto, and finally by the chains 25$^b$ and 26$^b$, to the downwardly extending projections 8$^d$ and 8$^c$, of the plate carriers 8$^a$.

For the sake of clearness of description, the standard focus of the apparatus has been assumed to be six inches and the equivalent focus of the lens as 24 inches, resulting in a gear proportion of one to four. It will be however, seen that by making the standard focus of the apparatus adjustable between say 6 and 7, inches, it is possible to adapt the mechanism for use in connection with lenses of any focal length between the limits of 12 and 28 inches, and thus make it useful for almost all practical working conditions existing in the photo-mechanical trade, when using gear proportions of 1 to 2, 1 to 2$\frac{1}{2}$, 1 to 3, 1 to 3$\frac{1}{2}$ and 1 to 4, and it is always possible to divide the focal length of lenses ranging from 12 to 28 inches by one of these factors, to obtain a quotient falling between 6 and 7. For instance, if the lens be of 19.35 inch focal length, the gear proportion 1 to 3, is selected and the standard focus of the mechanism is adjusted at $$\frac{19.35}{3} = 6.45 \text{ inches.}$$

The pivot 9$^a$, is then adjusted at a height of 6.45 inches above the line uniting the driving point of the saddle with the fulcrum point and the mechanism will produce conjugate distances for a lens of 19.35 inches in focal length.

The mode of operation of the focusing means illustrated in Figs. 1, 2 and 3, as used in connection with a lens of 24 inch focus, is as follows:—The operating lever 15, is moved until the distance between the centers of the two oscillating guide-blocks 11$^a$ and 12$^a$, is equal to twelve inches. With the mechanism set to such adjustment which is called the unit position, the lens holding frame 24, of the camera, is placed so that the distance between the first nodal point of the lens and the object surface is equal to twice the focal length of the lens or 48 inches. In this position the downwardly projecting arm 23$^b$, shown in Fig. 1, is firmly secured to the endless chain 23$^a$, passing over the sprocket-wheel 23, placed in the middle of the camera-bed 6ª, as illustrated in Fig. 1. The plate-holding frame 8ª, is now adjusted so that the distance between the image plane and the second nodal point of the lens 18, is also equal to twice the focal length, in which position it is firmly attached to each of the two endless chains 25ᵇ and 26ᵇ, passing over the large sprocket-wheels 25 and 26 and 25ª and 26ª, on either side of the camera-bed 6ª. Both the camera and the focusing mechanism are now in the correct adjustment for a reproduction in equal size of the object, and any change in position of the lens slide 7, caused by the movement of the operating lever 15, will cause a proportionately increased movement of the lens 18, whereas the simultaneous movement of the plate slide 8, will cause the image-support, to be moved to the corresponding position for a sharp image of a size determined by the distance between lens and object.

With reference to Fig. 1, it will be observed that the arrangement of the operating lever 15, the double-armed lever 14, and the link 17, which connects the latter to the extension 7ª, of the plate-slide, is such that when the lever 15 is moved toward the right, that is, toward the plate-holding end of the camera, the lens-slide 7, will also move toward the right, whereas the plate-slide 8, will move toward the left, that is, toward the lens-slide of the camera, while the pivot-pin 9ª, simultaneously causes the rod 11, to assume a more slanting position, and the rod 12, to assume a more upright position. The continued movement of the lever 15, will cause the pivot 9ª, to reach a point in which both the rods 11 and 12 will make an angle of 45°, with the imaginary line draw through the centers of the oscillatory guides 11ª and 12ª, which position, as already stated, is known as the unit-position. Up to the moment that this position is reached, the motion of the lens-slide 7, and the plate-slide 8, continues to be in opposite directions, but from this point on, the further movement of the lever 15, toward the right, will cause both slides to move toward the right, the lens-slide always moving faster than the plate-slide, and thereby continually decreasing the distance between the lens and the plate and increasing the distance of both of these elements from the object surface 19, until finally the position for maximum enlargement has been reached, when the plate has returned to the same point as occupied in the position for maximum reduction, while the lens has approached the plate to within the same distance as it had from the object when in the position of maximum reduction, which latter position is that in which Fig. 1, shows the mechanism. It will thus be clear that a continuous movement of the lever 15, in one direction through its full course, causes the lens and plate slides to move part of their course in opposed directions and part of their course in the same direction from limit to limit of their total range of adjustment.

Although the mechanism as described and illustrated is of preferred construction, it is nevertheless obvious that it may be modified to suit different purposes without thereby departing from the nature as well as scope of my said invention as defined by the claims.

Having thus described the nature and objects of my invention, what I claim as new and desire to secure by Letters Patent is:—

1. In a focusing apparatus, a support, a plate-slide and a lens-slide carrying a pivot, adapted to move along said support, a lens-carrier, means operatively connecting the same with said lens-slide, a plate-carrier, means operatively connecting the same with said plate-slide, rods arranged at right angles to each other and operatively connected with said support and slides, and operating means adapted to shift the pivot of said lens-slide by one continuous forward movement, or by one continuous backward movement, to cause said lens-slide and said plate-slide to move, partly in the same direction and partly in opposite directions through the entire range of their relative adjustment from the position of maximum reduction to the position of maximum magnification.

2. In a focusing apparatus, a support carrying an oscillatory fulcrumed slide-block, a lens-slide carrying a pivot, and a plate-slide carrying an oscillatory slide-block, rods arranged at right angles to each other, rotatably suspended on said pivot and respectively engaging said slide-blocks to thereby control the relative movement of said lens-slide and plate-slide, a lens support, means operatively connecting the same with said lens-slide, a plate support and means operatively connecting the same with said plate-slide, said operative connections causing the ratio of the movements of the lens-slide and lens-carrier to be equal to the ratio of the movements of the plate-slide and plate-carrier.

3. In a focusing apparatus, a lens-slide, a support for said slide, a plate-slide adapted to travel along said support, oscillatory guides, rods arranged at right angles to each other and pivoted at the point of their intersection to said lens-slide, said rods engaging said oscillatory guides pivoted respectively on said support and plate-slide, a lens-carrier, means operatively connecting the same with said lens-slide, said operative connections causing the driving point of said lens-slide and said lens-carrier to assume simultaneously corresponding points in their trajectories, a plate-carrier, and means operatively connecting the same with said plate-slide, said last named operative connections causing the driving point of said plate-slide and said plate-carrier to simultaneously assume corresponding points of their respective trajectories.

4. In a focusing apparatus, a support carrying a fulcrum, a lens-slide adapted to travel along said support, a plate-slide adapted to travel along said support, oscillatory guides, one of which constitutes a fulcrum slide, a set of rods arranged at right angles to each other and pivoted at the point of their intersection to said lens-slide, said rods engaging said oscillatory guides, the fulcrum slide formed by one of said guides being pivoted in the fulcrum carried by said support and the other guide being pivoted to said plate-slide to control thereby the relative movements of said lens-slide and plate-slide, operating levers adapted to shift the suspension point of said rods along said support, a lens-carrier, a plate-carrier, connections between said lens-slide and lens-carrier, and connections between said plate-slide and plate-carrier to cause said lens-slide and plate-slide to reach points in their trajectories simultaneously with the arrival of said lens-carrier and plate-carrier respectively in corresponding points of their respective trajectories.

In witness whereof, I have hereunto set my signature in the presence of the two subscribing witnesses hereto.

LODEWYK J. R. HOLST.

Witnesses:
J. WALTER DOUGLASS,
THOMAS M. SMITH.